June 29, 1943.	W. GLAMANN	2,323,028
INTERNAL COMBUSTION ENGINE
Filed June 28, 1940	2 Sheets-Sheet 1

INVENTOR
Wilhelm Glamann
BY
ATTORNEYS

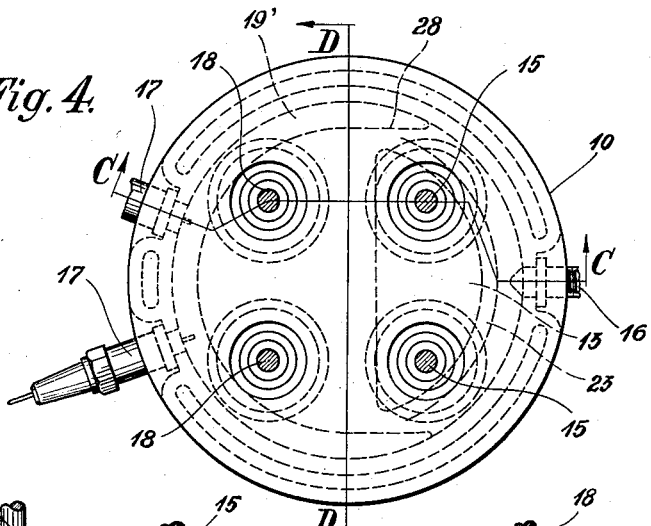
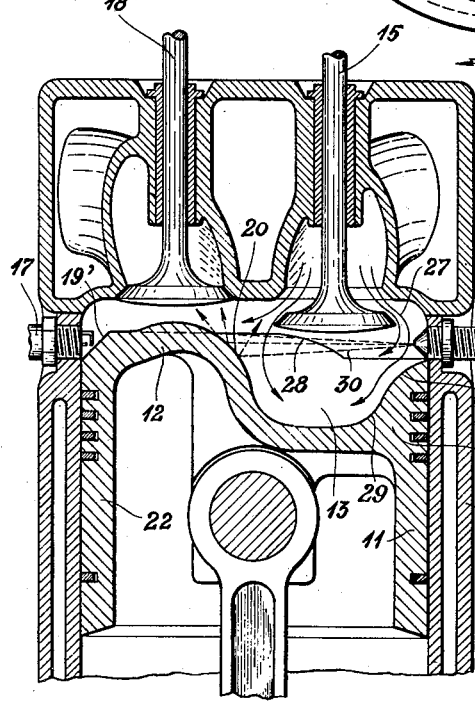
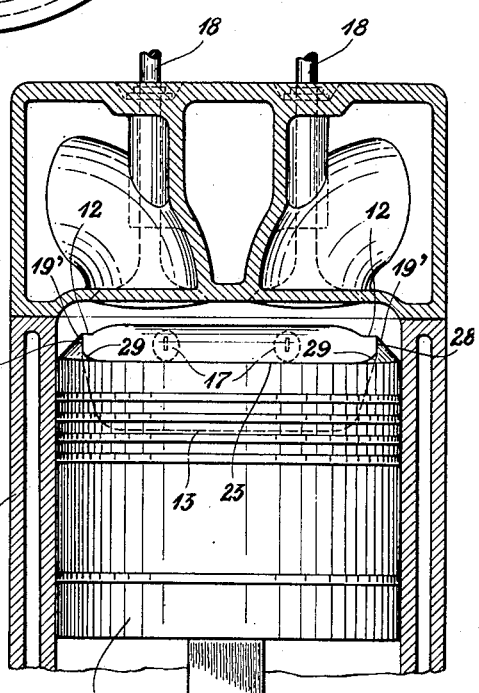

UNITED STATES PATENT OFFICE 2,323,028

INTERNAL COMBUSTION ENGINE

Wilhelm Glamann, Stuttgart, Germany; vested in the Alien Property Custodian

Application June 28, 1940, Serial No. 342,882
In Germany April 27, 1939

2 Claims. (Cl. 123—32)

The invention relates to an internal combustion engine particularly of the fuel injection spark ignition type.

The object of the invention is to lessen the inclination of the engine to knock, specially under high loads at high temperatures. A further object of the invention consists in means for producing a most uniform mixture of air and fuel in the engine cylinder, in order to create in this way an increase of the output of the engine, and a most favorable fuel consumption.

A further object of the invention lies in the safety of operation of the engine, guaranteed by a favorable cooling of highly stressed parts by means of the fuel jet.

An important characteristic of the invention consists in the fact that the combustion space formed between the piston head and the endwall of the cylinder is divided into a main combustion chamber, formed by a recess in the piston head, preferably laterally transposed relative to the cylinder axis, and a flatter combustion space, being located between the remaining part of the piston head and the endwall of the cylinder or the cylinder head. In the extreme case this flatter combustion space could approach the zero value, the piston head in this place approaching very closely to the cylinder head.

The ignition device serving for igniting the mixture is preferably placed in the flatter combustion space, while the injecting nozzle discharges into the main combustion space. Furthermore the inlet valve or valves are preferably arranged above the main combustion space, and the outlet valves within the flatter part of the combustion space. Of special advantage is the arrangement of the ignition device in the flatter part of the combustion space formed by the piston head and the end wall of the cylinder, particularly also for the reason that by these means a shock-like pressure wave which might be the cause for knocking symptoms will be avoided, but on the other hand the ignition wave would be able to advance with greater speed in the combustion chamber, as in the igniting moment, at the end of the compression stroke a current exists, flowing from the flatter part of the combustion space into the main combustion chamber, and has the same direction as the spreading ignition wave, accelerating the latter.

Further advantages of the invention are evident from the following description.

The invention is specially important for engines strongly loaded and operating at high temperatures, like aeroplane motors and the like which are mostly equipped with more than two valves supported in the cylinder cover. It is generally applicable to mixture compressing engines with separate ignition, but specially important for such engines in which a light fuel, which inclines particularly to knocking symptoms, is injected directly into the cylinder space of the engine.

Further objects and advantages of this invention will be apparent from consideration of the specification as illustrated by the accompanying drawings of possible embodiments of the invention, in which drawings:

Fig. 1 shows a cylinder of an internal combustion engine in a view from above.

Fig. 4 is a plan view of a somewhat altered type.

Fig. 5 shows a section through the cylinder along the line C—C of Fig. 4, the inlet valve being opened.

Fig. 6 shows a section through the line D—D of Fig. 4.

Figure 2:
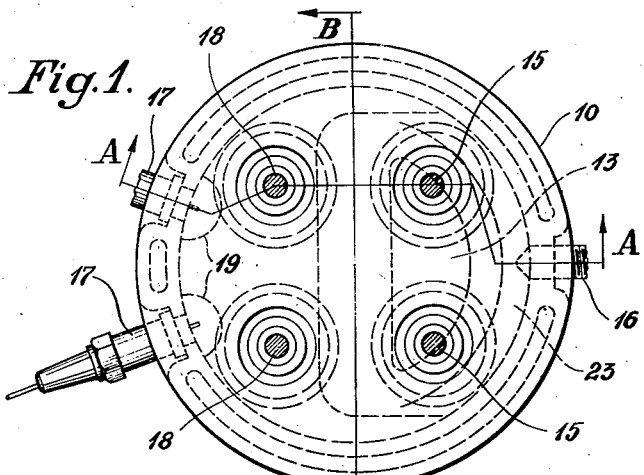
Fig. 2 shows a section through the cylinder and the piston in the line A—A of Fig. 1.
Figure 3:
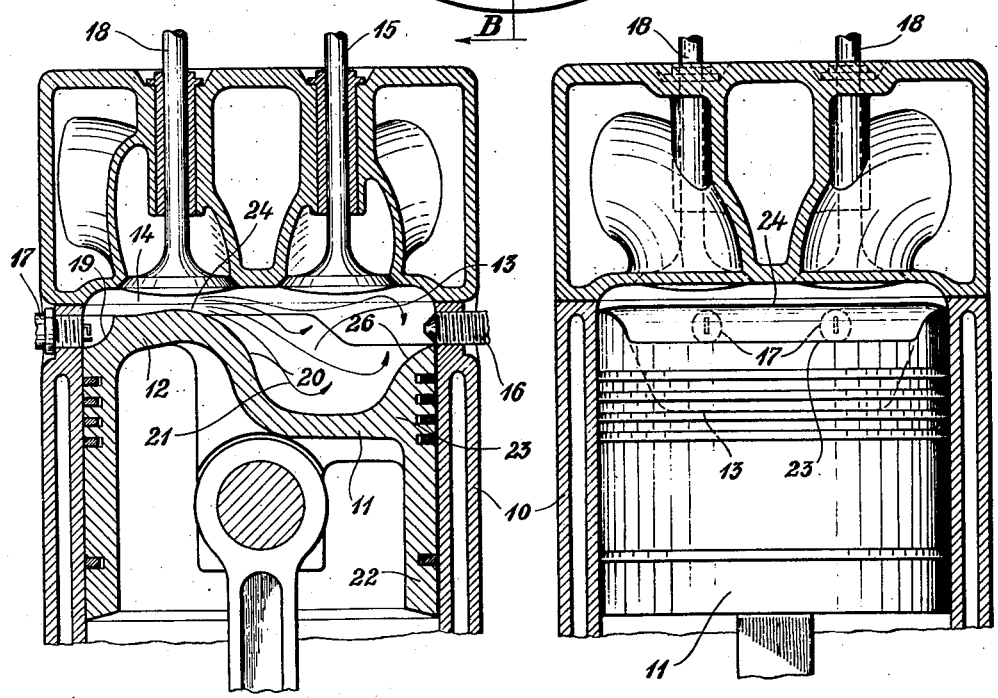
Fig. 3 shows a section through the cylinder along the line B—B of Fig. 1 and a view of the piston, the piston being shown in elevation.

With the type shown in the Figs. 1 to 3, in the cylinder 10 a piston 11 is sliding, the bottom of which is provided with a recess 13 arranged on one side, forming in the upper dead center of the piston the main combustion chamber of the engine, while between the remaining not recessed part of the piston bottom and the wall of the cylinder head a shallow partial combustion space 14 is formed.

The inlet valves 15 are arranged above the main combustion chamber 13, the outlet valves 18 above the not recessed piston bottom. The injecting nozzle 16 discharges into the main combustion chamber 13, while the spark plugs 17 are located aside of the main combustion chamber 13 in the zone of the cylinder wall lying next to the not recessed part of the piston head 12. In the example shown they are arranged in the cylinder wall, in the place of greatest distance from the combustion chamber, in such manner that when the piston 11 finishes its inward stroke, they are placed in lateral pockets 19 of the piston bottom, and are protected by the piston head against the main combustion chamber.

The type shown in the Figs. 4 to 6 is distinguished from the one according to Figs. 1 to 3 substantially by the fact that the igniting plugs 17 instead of being arranged in recessed cavities 19 are placed in back of the conical slope 19' of the piston rim.

Adjacent the passage 20 towards the combustion chamber, the not recessed part of the piston 12 is formed with an upwardly extending ridge 24, so that at this place it lies somewhat higher than the point of ignition 17 and forms a throttling place between the shallow part 14 of the combustion space and the main combustion chamber 13.

The passage 20 between the recess 13 and the not recessed part of the piston bottom 12 is rounded with a comparatively large radius. Furthermore this passage is followed at both sides by ridges 28, also with smoothly rounded passages formed by the piston body 22 which remains here in its full height, and which passes again at 29 ultimately into the lower part 23 of the piston body.

The outer wall of the recess 13 formed by the piston body 22 is in its part 23 which is turned towards the injection nozzle 16, formed less high than the remaining side wall of the recess, and is besides well rounded at its upper edge 26, so that the fresh air being sucked in during the downward stroke of the piston through the inlet valves 14 in the direction of the arrows 27 (Fig. 5) may stream unrestrained into the cylinder in order to mix with the vaporous fuel.

The modus operandi of the engine is as follows:

During the suction stroke of the piston, air is sucked through the inlet valves 15 which air will be compressed during the following compression stroke in the upper part of the cylinder 10. Concomitantly with the entry of the air, the fuel, a light fuel like petrol or gasoline in fine vaporisation is injected through the injection nozzle 16 across the main combustion chamber and, past the inlet valves, directed to the opposite side of the main combustion chamber. Herewith it mixes as well with the air entering through the inlet valves as also with the air streaming alternatively between the partial spaces 13 and 14, so that by a thorough mixing a uniform combustion mixture will be formed.

When following to the suction stroke the piston 11 again moves upward in order to compress the fuel-air mixture contained in the cylinder, the mixture in the last part of the compressing stroke will be compressed by the not recessed part of the piston head 12 working in a way as displacer, mainly into the recess 13 of the piston head (Fig. 2), causing a lively motion of the mixture in the direction of the arrows 21 and a very thorough uniformity of the mixture. If now the mixture is ignited in one place shortly before the piston reaches its inner dead center, by means of the ignition plugs 17, the not recessed displacer part of the piston drives the ignition flame at the end of the compression stroke with great velocity but under thorough control into the recess 13 where the main portion of the mixture will be ignited, so that the recess 13 acts as combustion chamber or better as main combustion chamber. The passage of the combustion chamber 13 into the not recessed part of the piston head being rounded on all sides, the streaming of the partly already ignited mixture into the combustion chamber ensues without forming any disturbing marginal eddies on sharp edges of passages or the like, which might cause an uncontrolled ignition of the mixture. On the contrary the propagation of the ignition flame and with it the ignition of the mixture ensues in the engine built in accordance with the invention in a compulsory manner, controlled by the movement of the piston, the cooling metal walls of the not recessed part of the piston head and of the cylinder head preventing the involuntary and fast spreading of the ignition flame in the narrow crevice being formed between these parts, at the end of the stroke, by means of radiation or by pressures waves in the direction to the combustion chamber.

The burning mixture drives the piston power-producing downward, whereupon during the following upward stroke of the piston, the combustion gases will be expelled through the outlet valves 18 from the cylinder 10.

As also in the upper dead center of the piston the injection nozzle 16 will not be covered by the piston, the injection of new fuel can be started immediately after the termination of the exhaust stroke, producing thereby a good mixing of the fuel with the incoming fresh air. Herewith the fuel jets 30 meet mostly the rounded passage place 20 between the main combustion chamber and the not recessed part of the piston head, so that this place which is inclined to be easily overheated, will be very effectively cooled by the delivery of heat necessary for the evaporation of the fuel. Part of the fuel will be deviated at the passage place 20 towards the outlet valves 18 in order to cool them also, while the remainder of the fuel comes during the following downward stroke of the piston near to the spark plugs 17, producing here a particularly good mixture, very apt to be ignited, and preventing simultaneously an overheating of the spark plugs.

It has been found that when using the above described arrangement it is possible to make use of fuels with a substantially lower octane factor than usual, also in internal combustion engines of the high performance type, for instance in aeroplane motors without special inclination of the engine to knock, the compression not necessarily being decreased and no decrease of the output and no increase of the fuel consumption being evident. On the other hand with fuels of usual octane factors the compression may be increased without an inclination of the engine to knock being noticed, while at the same time a decrease of the specific fuel consumption is found.

The cause for this important result is to be seen in the fact that by the arrangement of the spark plugs according to the invention it has been prevented that within the mixture, compressed almost to the self-ignition limit, blow-like acting pressure waves would have been formed, issuing from the place of ignition, and preceding the ignition flame, and causing a detonation-like combustion of the mixture in the combustion chamber.

By the fact that the ignition flame spreading from the igniting places has to pass through the comparatively low space between the cooling metal walls of the cylinder head and the not recessed part of the piston head, the flame is kept comparatively cool. Therefore it cannot produce in the parts of the mixture which it first meets so great an impact, that dangerous pressure waves will be created within the mixture. Herewith also the throttling place provided at 24 may be found of advantage. On the other hand the ignition flame has the opportunity on its way from the place of ignition to the combustion chamber to spread to both sides, so that at the main combustion chamber a broad flame front arrives actually causing a pure flame ignition, and therewith an exact control of the ignition time within the main combustion chamber.

Although the spark plugs are arranged on the side of the flatter part of the combustion space, opposite to the main combustion chamber i. e. as far away as possible from the hottest part of the charge in the combustion chamber, they are simultaneously protected against overheating, so that also a substantial cause for a premature red-hot ignition of the mixture will be eliminated. The same may be said of the position of the outlet valves 18, if these, as shown in the illustrated example, are arranged above the not recessed part of the piston head. Such an arrangement is most favorable if two outlet valves are provided.

Having now particularly described and ascertained the nature of my invention and several ways in which it may be applied, I declare that what I claim is:

1. In an internal combustion engine an engine cylinder, a piston movable therein, the piston head being shaped in such manner relative to the cylinder head that at least two combustion spaces are formed one comprising a shallow space and the other an enlarged space, the piston head being formed with a transversely extending ridge adjacent the shallow space acting to guide mixture flowing from the shallow space to the enlarged space.

2. In an internal combustion engine an engine cylinder, a piston movable in it, a recess at one side of the piston head forming a main combustion space, while the opposite part of the piston head extends comparatively near to the end wall of the cylinder when the piston is at outer dead center, an injecting nozzle arranged in the lateral cylinder wall on the side of the recess, and a rim upon the piston head rising above the bottom of said recess being however lower than the part of the piston head opposite to the recess, so that the fuel jet injected by the nozzle can be issued into the main combustion space over the said rim, when the piston is at its outer dead center position.

WILHELM GLAMANN.